Patented June 24, 1930

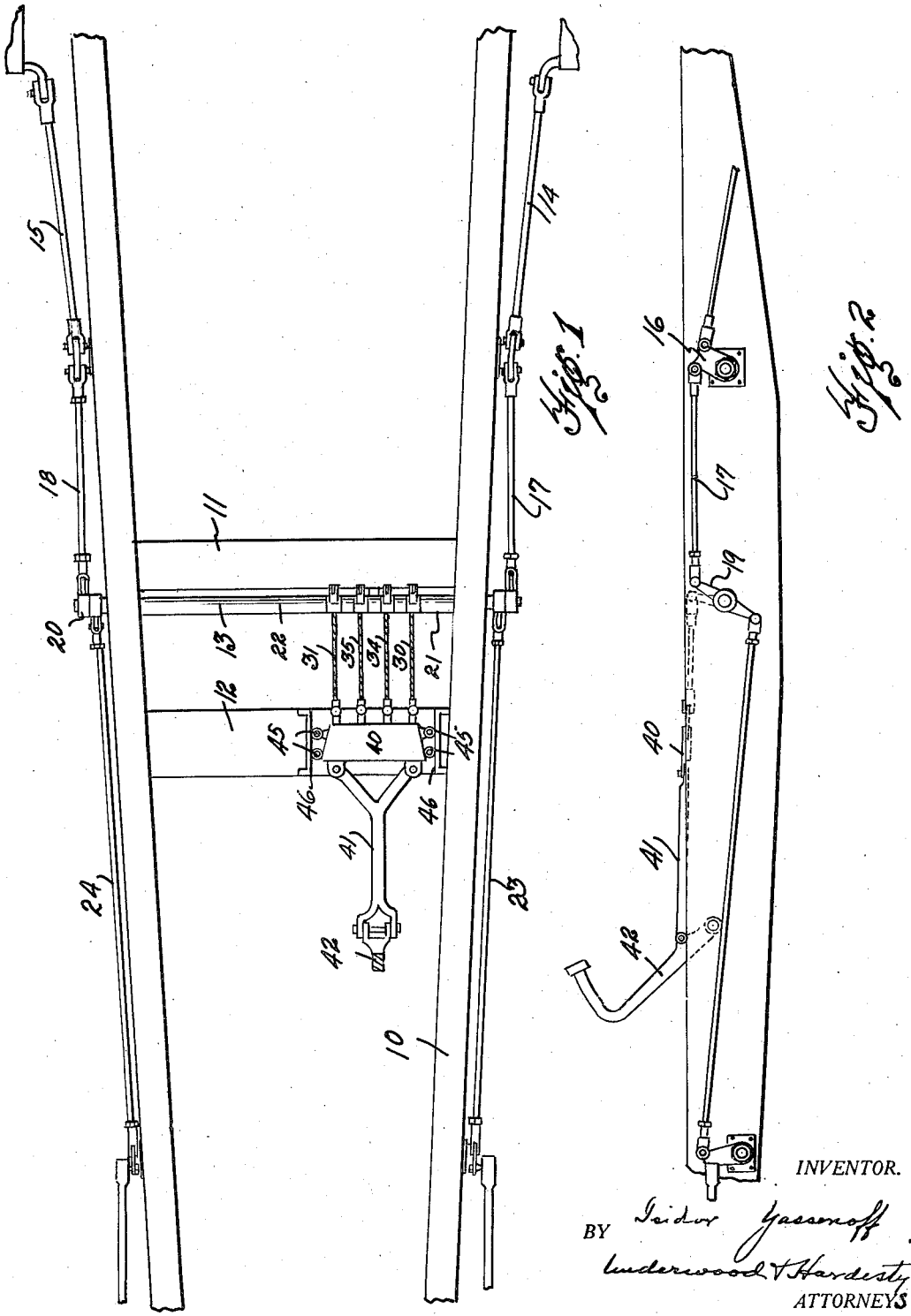

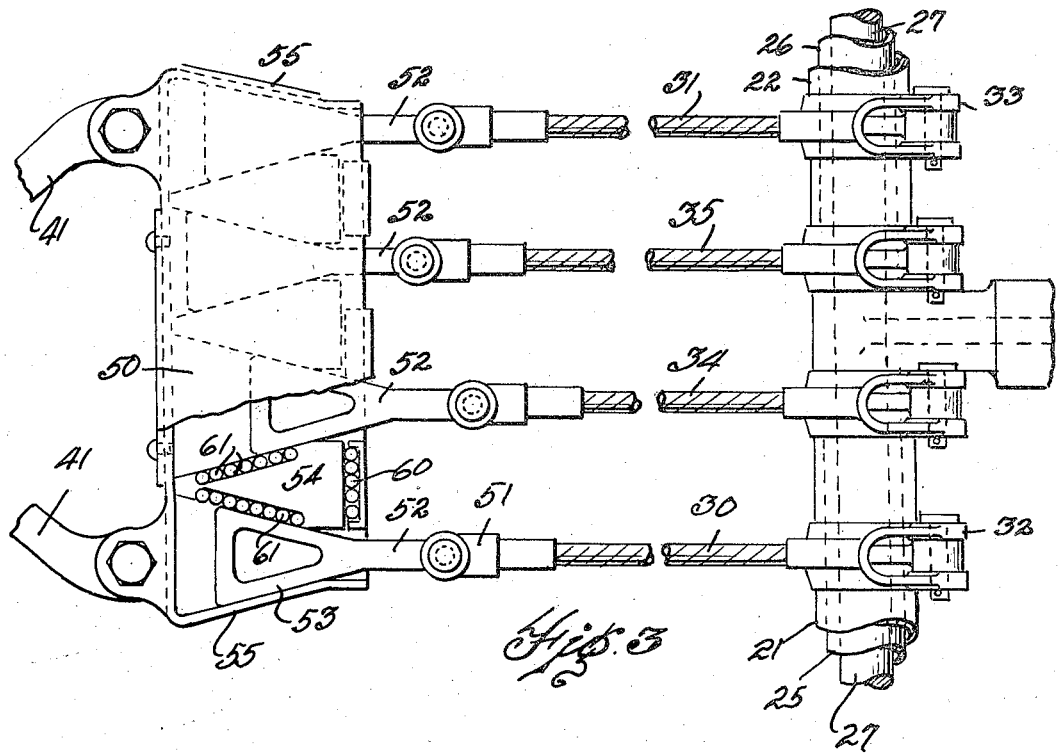
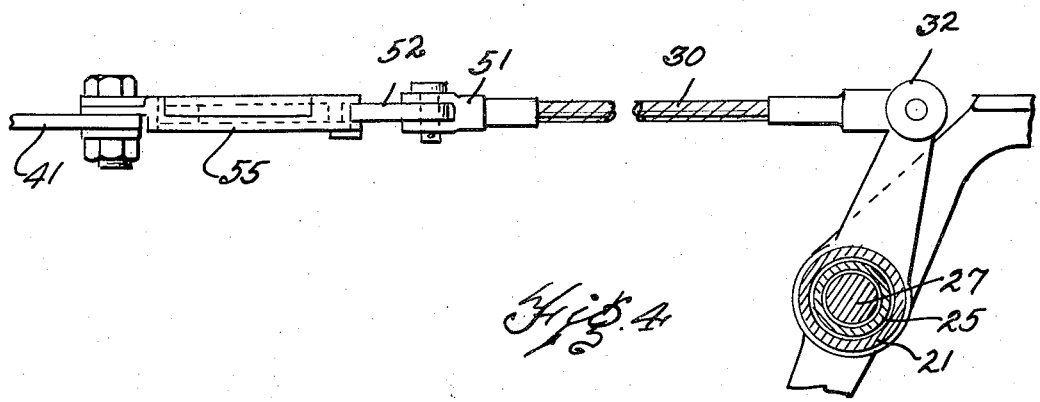

1,765,749

UNITED STATES PATENT OFFICE

ISIDOR YASSENOFF, OF DETROIT, MICHIGAN

DEVICE FOR EQUALIZING STRESSES

Application filed September 4, 1928. Serial No. 303,626.

The present invention relates to devices for equalizing stresses.

Among the objects of the invention is a device which will accurately distribute to a plurality of loads equal amounts of a single applied force.

Another object is a device that will make such a distribution regardless of their variation within the limits for which the particular device may be designed.

Still other objects will readily occur to those skilled in the art upon reference to the following description and the accompanying drawings in which for the purpose of illustration is shown a four wheel brake installation embodying the equalizer, although other applications of the device will be obvious.

In the drawings, Fig. 1 is a plan view of the frame and brake system of an automobile with parts omitted.

Fig. 2 is a side view of the same.

Fig. 3 is an enlarged plan view of the equalizer and attached parts, and

Fig. 4 is a side view of the Fig. 3.

In the brake installation shown in the drawings, Figs. 1 and 2, the frame of the vehicle is indicated at 10 with suitable cross members 11 and 12 and a tube assembly at 13, which latter will be described more in detail later, but which is adapted to transfer the pull from the brake pedal to the several brakes on the wheels. The link connected with the left rear wheel is indicated at 14 and that to the right rear wheel at 15. These links 14 and 15 are connected to blocks in turn connected to second links 17 and 18 respectively.

The links 17 and 18 are connected through crank arms 19 and 20 to the inside tubes 25 and 26 of the tubular assembly above mentioned.

A similar arrangement of links 23 and 24 connects the front wheel brakes to the outer tubes 21 and 22 respectively which tubes are carried on a cross rod 27 shown in Fig. 3.

In Fig. 1, therefore, the two outside cables 30 and 31 lead from the crank arms 32 and 33 to the front brakes and the cables 34 and 35 are connected in similar manner to the rear brakes.

These four cables, each leading to a single brake are connected in parallel to the equalizing device 40, which in turn is connected through link 41 to the brake pedal pivoted at any suitable point upon the frame work.

The equalizing device 40 will preferably be provided at each end with rollers 45 adapted to coact with guides 46 on the cross member 12 for a purpose to be explained later.

The equalizing device which forms the principal object of the present application is shown best in Figs. 3 and 4 and consists of a casing 50 closed on its upper, lower and front sides and provided with as many openings in its rear side as there are brakes on the vehicle. Each cable leading to a brake is provided at its free end with a clevis 51 to which is secured a member 52 which is wedge shaped at its free end, as shown clearly at 53 in Fig. 3.

These members 52 extend into the casing 50 through the openings above mentioned and within the casing are separated by a plurality of other wedge shaped members 54 oppositely arranged, that is, the triangular portions of the members 53 and the triangular wedges 54 are so arranged that the bases of the former are near the front side of the casing and rest against the intact portion of the rear side between the openings for members 52.

At each end of the casing, the wall 55 will be inclined so as to furnish a bearing for the outer side of the outer members 53.

In the form shown in Fig. 3, the four members 53 are separated by three of the wedges 54 and the latter are arranged to float freely laterally in the casing. The result of this arrangement is that when the resistance of the four brakes varies, the four members 53 will be withdrawn from the casing 50 different amounts depending upon the resistance offered and the wedge members 54 will move laterally to compensate for the differing positions of the members 53 so that an equilibrium will be established between the four members 53 and an equal part of the pedal pull on the casing 50 through link 41 will be applied to each member 52 and the cable attached thereto.

In order to prevent any sidewise or angular movement of the equalizer 40, it is preferred to provide the guides 46 and rollers 45 to fix the forward and backward movement in a definite predetermined path.

Of course it will be desirable to provide means for decreasing the friction between the several wedge shaped parts in the casing 50 and this may be done in a variety of ways. The casing may be packed with a suitable lubricant and means provided for preventing its passage through the openings in the rear side and in addition, ball or roller bearings 60 may be placed at the base of the wedge members 54 in order to aid the lateral movement thereof and the other rollers 61 may be placed in the inclined edges of said members in suitable grooves, in order to decrease the friction between the said inclined edges and the adjacent edges of members 53.

While the device has been described in connection with vehicle brakes, it is obvious that other uses for it may be found and it is therefore not to be considered as limited to the specific use described herein.

Now having described the invention and the preferred form of embodiment thereof, it is to be understood that the said invention is to be limited, not to the specific details herein set forth, but only by the scope of the claims which follow:

I claim:—

1. Means for distributing a single applied force to a plurality of force receiving devices comprising a casing, means for applying a force tending to move said casing, a plurality of floating wedges in said casing, a plurality of other wedges in said casing spaced apart by said floating wedges, and a force receiving element secured to each of said other wedges.

2. Means for distributing a single applied force to a plurality of force receiving devices comprising a casing, means for applying a force tending to move said casing, a plurality of floating wedges in said casing, a plurality of other wedges in said casing spaced apart by said floating wedges, and a force receiving element secured to each of said other wedges there being antifriction elements between said floating wedges and surfaces with which they contact.

3. Means for distributing a single applied force to a plurality of force receiving devices comprising a casing, means for applying a force tending to move said casing in a direction away from said force receiving devices, a plurality of floating wedges in said casing having their apieces pointed in the direction of said moving force, a plurality of other wedges in said casing spaced apart by said floating wedges and disposed in opposite position from said floating wedges.

4. In a brake system for vehicles, a manually operated lever adapted to operate all of the brakes, an equalizing device to which braking power is applied, a separate linkage extending from said device to each brake, said equalizing device comprising a casing adapted to be moved bodily by the application of said braking force, a plurality of floating wedges in said casing, a plurality of other wedges in said casing to each of which is connected one of the brakes through a suitable linkage, said other wedges being separated by said floating wedges and having the two sets of wedges oppositely arranged whereby the bases of the floating wedges are arranged opposite the apices of the other wedges.

ISIDOR YASSENOFF.